United States Patent [19]

Simeone et al.

[11] Patent Number: 5,589,552
[45] Date of Patent: Dec. 31, 1996

[54] COATINGS BASED ON POLYESTERS FROM PERFLUOROPOLYETHERS

[75] Inventors: Giovanni Simeone, Solaro; Fabrizio Mutta, Caronno Pertusella; Angelo Locaspi, Milan; Claudio Tonelli, Concorezzo, all of Italy

[73] Assignee: Ausimont, S.p.A., Milan, Italy

[21] Appl. No.: 531,925

[22] Filed: Sep. 21, 1995

Related U.S. Application Data

[62] Division of Ser. No. 234,661, Apr. 28, 1994, Pat. No. 5,476,721.

[30] Foreign Application Priority Data

Apr. 28, 1993 [IT] Italy .................. MI93A0838

[51] Int. Cl.$^6$ .................... C08F 20/00; C08G 73/24
[52] U.S. Cl. .................. 525/440; 528/272; 528/274; 528/299; 528/300; 528/301; 528/401; 525/437; 525/444; 525/445
[58] Field of Search .................. 528/272, 274, 528/299, 300, 301, 401; 525/437, 440, 444, 445

[56] References Cited

U.S. PATENT DOCUMENTS 2,242,218  5/1941  Auer ......................... 427/316
3,715,378  2/1973  Sianesi et al. ............ 558/283

*Primary Examiner*—Samuel A. Acquah
*Attorney, Agent, or Firm*—Bryan Cave, LLP

[57] ABSTRACT

Coatings obtainable from crosslinkable polyesters resins based on perfluoropolyethers obtainable from hydroxy-terminated PFPE, with acid anhydride and/or a diacid, a polyol with functionality higher than 2 and optionally in mixtures of diols having a functionality of 2, the resins being also even 70% weight/weight soluble in xylene.

11 Claims, No Drawings

COATINGS BASED ON POLYESTERS FROM PERFLUOROPOLYETHERS

This is a divisional of U.S. application Ser. No. 08/234,661, filed Apr. 28, 1994, now U.S. Pat. No. 5,476,721.

The present invention relates to resins to be employed as coating, in particular to polyesters (PE).

More particularly, the polyesters of the invention contain fluorinated blocks.

The fluorinated polymers are known for their good mechanical properties and their chemical resistance, water repellency and resistance to UV radiations. However, their insolubility in the solvents normally used in varnishes makes them unusable for certain applications, for instance in the preparation of paints and varnishes.

It is known, from the other hand, that the use hydrogenated polyester resins allows to obtain coatings showwing very good mechanical properties; however, they show a poor chemical resistance, resistance to solvents and to UV radiations.

Elastomeric wholly fluorinated PE, as for instance the ones of U.S. Pat. No. 3,810,874, are known. These polymers, however, cannot be utilized as coatings as they are insoluble in the usual solvents utilized for coatings in the case of the corresponding hydrogenated polyesters. Even if one concedes to find out a solvent, these polyesters are not utilizable as coating, as they have poor adhesion to the support and moreover poor mechanical properties, for instance poor hardness.

Even conceding to crosslink these polyesters, they show a very low crosslinking density, therefore it is not possible to considerably increase their mechanical properties by crosslinking.

Polyesters from PFPE with hydrogenated blocks are also known, they however show all the drawbacks indicated for polyesters from perfluoropolyether of the above indicated U.S. patent.

Moreover the Applicant has experimentally found that the fluorinated part in these polyesters is confined in particular fields, so modifying the material from the optical point of view. Non trasparent polymers are in fact obtained. If the PFPE content is high with respect to the hydrogenated content, the hydrogenated part is confined. Therefore the transparence disappears, so that these polyesters are not suitable in the varnishes field also when it is desired to pigment them.

Furthermore, as said above, they show solubility problems due to the different nature of the components. They are not soluble in the usual solvents, for instance in xylene commonly utilized in varnishes.

It is known to utilize also other types of fluorinated polymers as coating, for instance the polymer from vinylydenefluoride (VDF) with tetrafluoroethylene (TFE) and/or perfluoropropene (HFP); however the mechanical properties of these polymers are poor and they can be applied only in solutions at most at 2–3%. Moreover these products show a poor chemical resistance with respect to alcohols and ketones and give swelling.

Furthermore they have also the drawback to require high dilutions for their applications. Besides, they are products having high Tg for the applications in which it is requested a good adhesion and resistance to deformation at the same time. These properties are poor, therefore these products cannot be utilized in the practice as high performance coating. Anyway solutions having high dry-content cannot be made. This has the drawback that high amounts of solvents must be used with consequent environmental and industrial problems for their recovery.

Alternated fluorinated polymers for coating based on CTFE (chlorotrifluoroethylene) and hydrogenated vinylethers or vinylesters are also known. These products too require high dilutions as indicated above, therefore they present the cited unavoidable drawbacks.

Water coatings are also known, however they do not have good appearance properties comparable with the systems in solvents, as one can verify from gloss measurements.

Object of the present invention is obtaining polyesters for coating with the optimal combination of properties indicated above: transparency and homogeneity in the sense that there is no appreciable confinement leading to variations of optical properties, high mechanical properties, chemical resistance with respect to alcohols and ketones, resistance to hydrolysis, oil and water repellency, resistance to UV radiations, no showing of swelling phenomena, resistance to deformation.

The polyesters object of the present invention must instead overcome the above indicated drawbacks, when one wants to utilize them in coil-coating, where high adhesion combined with good hardness and elasticity are required.

Another application is top coating in the car field instead of the commonly utilized acrylates having not high chemical resistance, or painting of hulls with high chemical resistance combined with the indicated mechanical properties.

The resins of the present invention moreover can be applied also in the wood field, as indicated later on, due to the characteristics of permeability to gas of the polyesters of the present invention, as defined hereinunder.

The Applicant has surprisingly and unexpectedly found that it is possible to obtain coating with the combination of the indicated properties with the resins hereinunder described.

Object of the present invention are crosslinkable resins based on fluorinated polyesters, containing F in % by weight about 0.5–40%, having high functionality, obtainable by reacting an hydroxy-terminated perfluoropolyether of average molecular weight of from 400 to 3000, preferably from 500 to 1500, with anhydrides and/or diacids and polyols with functionality equal and/or higher than 2, and capable of giving solutions in xylene even of 70% weight/weight.

The obtained resin is soluble in the common organic solvents utilized in varnishes and it is, therefore, particularly recommended for the preparation of paints and varnishes.

It has been surprisingly found that the polyester resins obtained from the reaction of a hydroxy-terminated perfluoropolyether, with anydrides and/or diacids and polyols with functionality higher than and/or equal to 2 maintain the typical mechanical and aesthetic properties of the conventional polyester resins, having also an exceptional chemical resistance, water- and oil-repellency, resistance to photooxidative degradation.

A further object of the present invention is a process for the preparation of a polyester resin having high functionality, obtained by reacting:

i) a hydroxy-terminated perfluoropolyether having average molecular weight of from 400 to 3000, of general formula

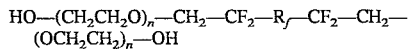

where n is an integer 1 to 4 or zero, $R_f$ represents a bifunctional radical having perfluoropolyethereal structure of average molecular weight of from 400 to 3000, formed by sequences of one or more oxyfluoroalkylenic units, such as for instance the units:

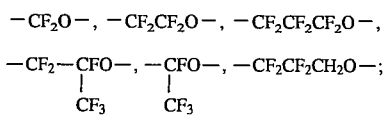

ii) an acid anhydride and/or a diacid of aliphatic type having from 3 to 20 carbon atoms, of cycloaliphatic or aromatic type having from 6 to 20 carbon atoms;

iii) an aliphatic hydrogenated diol having from 2 to 20 carbon atoms or a cycloaliphatic or aromatic hydrogenated diol having from 6 to 20 carbon atoms;

iv) an aliphatic polyol having from 3 to 20 carbon atoms, or a cycloaliphatic or aromatic polyol having from 6 to 20 carbon atoms with functionality equal or higher than 3.

Examples of $R_f$ of the component i) are compounds having perfluoroethereal structure, preferably selected from the compounds classes indicated below comprising constituent units of the type hereinunder indicated:

1) $(C_3F_6O)$, (CFXO)
randomly distributed along the perfluoropolyether chain, where X is equal to —F, —$CF_3$;

2) $(C_3F_6O)$;

3) $(C_3F_6O)$, $(C_2F_4O)$, (CFXO),
randomly distributed along the perfluoropolyether chain, where X is equal to —F, —$CF_3$;

4) $(C_2F_4O)$, $(CF_2O)$
randomly distributed along the perfluoropolyether chain.

The perfluoroetheral compounds containing the indicated units are known and are preferably selected among the following classes:

A) $(C_3F_6O)_m(C_2F_4O)_n(CFXO)_q$—
X is equal to —F, —$CF_3$; m, n and q are integers or, only in the case of n and q, also zero, whereby the average molecular weight is however at least 400. These products are obtained by photooxidation of $C_3F_6$ and $C_2F_4$ mixtures, according to the process described in U.S. Pat. No. 3,665,041 and U.S. Pat. No. 2,242,218.

B) —$(C_2F_4O)_p(CF_2O)_q$—
where p and q are integers equal or different each other whereby the ratio p/q is comprised betweeen 0.5 and 2. These perfluoropolyethers are prepared according to what described in U.S. Pat. No. 3,715,378.

The above indicated perfluoropolyethers are obtained in particular according to the Patent EP-A-239123 here wholly incorporated by reference.

The compounds of ii) are for instance: hexahydrophthalic, tetrahydrophthalic, chlorendic, phthalic, trimellytic, pyromellytic anhydrides; cyclohexandicarboxylic, adipic, isophthalic, terephthalic acids, etc.

Examples of iii) are neopentyl glycol, ethylene glycol, diethylene glycol, cyclohexanedimethanol, etc.

Examples of iv) are: trimethylol propane, trimethylol ethane, glycerol, pentaerythrol, dipentaerythrol, etc.

In the reaction one can utilize ratios among the various monomers selected in very broad ranges: ii/i by moles is between 2 and 50; the amounts of iii and iv depend on the final molecular weight of the resins; in any case, the hydroxy-terminated perfluoropolyether i) can be present in a broad range comprised between 0.5 and 40% by weight as fluorine on the total mass.

The polyesters object of the present invention can be prepared through polycondensation techniques, such as for instance polycondensation in mass or in solution.

Particularly suitable for the purposes of the present invention is a polycondensation process in two stages:

a) in a first stage the hydroxy-terminated perfluoropolyether and the acid anhydride are reacted, in order to obtain COOH terminated PFPE. The reaction temperature is maintained between 80° and 150° C. This allows to overcome the drawbacks due to the immiscibility of hydroxy-terminated PFPE in the anhydride/polyol mixture. For this reason the preparation is carried out, in the first stage, by feeding the hydroxy-terminated PFPE in the reactor containing the acid anhydride at a temperature comprised between 80° and 150° C. The initially formed intermediate reaction product having a terminal COOH group serves as solubilizing agent both towards the acid anhydride and the hydroxy-terminated PFPE not yet reacted. The operation is carried out in an inert atmosphere, under strong stirring, for a time sufficient to the complete conversion of the hydroxy-terminated PFPE. In such a way quite homogeneous three blocks prepolymers are obtained.

b) in a second stage, the possible diacid, and/or further anhydride and the diols/polyol mixture are added; in this phase distillation of the water formed during the polycondensation occurs. The reaction temperature is maintained between 180° and 220° C., under strong stirring and with a residual pressure of a few torr. The polycondensation time is function of the operating conditions, being generally comprised between 2 hours and 24 hours.

In order to favour the removal of the condensation water, one can work with the "solvent reflux" technique, by loading about 5% by weight of a solvent forming azeotrope with water. Such a solvent can be easily separated from the reaction water through a condenser and recycled into the reactor; an example of a solvent commonly used for this purpose is xylene.

This process is preferred when a hydroxy-terminated PFPE with molecular weight higher than 1000 is used.

With the purpose to increase the reaction kinetics in b) it is preferable to work in the presence of condensation catalysts, such as for instance salts of bi and trivalent metals such as calcium, manganese, iron, aluminum, zinc; germanium, lead and antimony oxides; alcoholates of alkaline metals (sodium, potassium); titanium alcoholates (isopropylate, butylate); organic acids of metals such as tin.

The polyester of the present invention shows a very good compatibility with different classes of solvents. If it is used as bonding agent in the formulation of paints and varnishes, it is generally diluted in suitable solvent or mixture of solvents. Usable solvents as diluents for the polyester resin object of the present invention are esters from $C_3$ to $C_{20}$, ketones, aromatic or alicyclic hydrocarbons from $C_6$ to $C_{12}$, aliphatic hydrocarbons, alcohols, etc.

Examples of ketones are: methylisobutylketone (MIBK), methylethylketone (MEK), isophorone.

Examples of alcohols are: $C_1$-$C_{12}$ aliphatic, cycloaliphatic and aromatic with a number of C atoms as indicated above for the hydrocarbons.

Examples of esters: butyl acetate, propylenglycole methyletheracetate (PMA), cellosolve acetate (ethoxyethanol acetate), etc.

As crosslinking agent, an agent of isocyanic type or an amino resin can be used.

Examples of crosslinking agent of isocyanic type are hexamethylene diisocyanate, isophorone diisocyanate, toluene diisocyanate, polyisocianates blocked with a blocking agent of phenol, alcohol, oxime, imine type, etc. When a crosslinking agent of isocyanic type is used, the ratio between the polyester and the crosslinking agent is preferably between 0.3 and 1.5 and more preferably between 0.8 and 1.2 in terms of equivalent ratio NCO/OH. Examples of crosslinking agents of alkyl etherated aminic resin type are melaminic, ureic, benzoguanamine resins, etc. The ratio between the polyester and the aminic resin is between 55/45 and 95/5, more preferably between 70/30 and 90/10 w/w.

Moreover, inorganic pigments such as titanium dioxide, zinc oxide, barium sulphate, etc., or organic pigments such as azo-compounds, carbon black, etc, can be used. These pigments are formulated in conventional way in amounts from 1 to 50% by weight, preferably from 5 to 50% by weight, in the case of inorganic pigments, and from 5 to 20% by weight in the case of organic pigments.

By appropriately varying the initial composition of the mixture, the fluorinated polyesters of the present invention permit to obtain resins with different characteristics, specific for the various applications.

Moreover it is possible to obtain polyesters with different content in fluorine, by appropriately varying the molecular weight of the hydroxy-terminated PFPE and/or the initial molar ratio of the hydroxy-terminated PFPE with respect to the other reactants.

A further advantage of the polyesters of the present invention is the possibility to obtain blends by mixing a polyester with high fluorine content with other resins, either fluorinated, for instance those based on CTFE as the above indicated ones, or preferably unfluorinated, for instance hydrogenated PE, acrylic resins, polyurethanic resins, etc., according to the applications. The PE of the present invention in fact shows a good compatibility with the indicated hydrogenated resins, so allowing to have a broad range of materials with improved properties with respect to the mixture components.

The following examples are given for illustrative purpose of the invention and are not to be considered as limitative of the same.

EXAMPLE 1

490 g of hexahydrophthalic anhydride (HHPA) are loaded into a 2 liter reactor equipped with stirrer, dripping device, partial and total condensing column, and nitrogen flowmeter; 219 g of hydroxy-terminated PFPE having average molecular weight 1200 are loaded into the dripping device; the reactor is brought to the temperature of 150° C., thereafter the hydroxy-terminated PFPE is fed under stirring under nitrogen atmosphere; the addition lasts about 1 hour, then the mixture is kept at the same temperature for further 30'. Thereafter the reactor is loaded with 219 g of neopenthyl glycol (NPG), 128 g of trimethylol propane (TMP), 1 g of FASCAT® 4100 catalyst (based on tin: dibutyl stannoic acid) and 50 g of xylene; temperature is raised up to 210° C. during 2 hours, condensing water separating from the azeotropic water-xylene mixture is collected, while xylene is refluxed into the reactor. The polycondensation is followed by titration of the acid groups, until a value of the acid number (A.N.) of about 10 mg KOH/g of resin (ASTM D 1639) is reached. OH number is 73, on a dry base. The resin is then diluted with xylene to 70% weight/weight concentration.

Example of Comparison with Example 1

607 g of HHPA, 295 of NPG and 169 g of TMP, 1 g of FASCAT® 4100 catalyst and 50 g of xylene are loaded into a 2 liter reactor equipped with stirrer, partial and total condensing column, a nitrogen flowmeter. Temperature is gradually raised, during 3 hours up to 210°–215° C. The polycondensation is carried out till a final acid number (A.N.) of 10 mg KOH/g and a OH number of 73, on a dry base; the resin is then diluted at 70% weight by weight in xylene.

EXAMPLE 2

With the same modalities of Example 1, the reactor is loaded with: 373 g of HHPA, while 422 g of hydroxy-terminated PFPE having average molecular weight=1220 are loaded into the dripping device; subsequently 145 g of NPG, 104 g of TMP, 1 g of FASCAT® 4100 catalyst and 50 g of xylene are loaded. The polycondensation is carried out until a final A.N. of 4 and a OH number on a dry base of 53. The resin is then diluted to 70% weight by weight in xylene.

Preparation of Varnishes

Coatings are prepared by mixing the components shown in Table 1.

TABLE 1

| Components | Examples | | | | | |
|---|---|---|---|---|---|---|
| | 4 | 5 | 6 | 7 | 8 | 9 |
| Example 1 | 100 | 100 | | | | |
| Example 2 | | | 100 | 100 | | |
| Comparative example 3 | | | | | 100 | 100 |
| Crosslinked HMMM | 17.6 | | 30 | | 17.6 | |
| p-TSA catal. | 0.4 | | 0.5 | | 0.4 | |
| Crosslinked N 3300 | | 17.7 | | 12.9 | | 17.7 |
| DBTDL catal. | | 00.5 | | 00.5 | | 0.05 |
| Xylene sulph. | 57 | 57 | 70 | 53 | 57 | 57 |

HMMM = Hexamethoxymethyl melamine
p-TSA = p-toluene sulphonic acid
N 3300 = Trimer of hexamethylen diisocyanate
DBTDL = Dibutyl Tin Dilaurate Preparations of Coatings (Crosslinking)

An acrylic alkylene primer (Deltron® D839/D803 produced by IVI-PPG) and an acrylic white base (Deltron® D 735 produced by IVI-PPG) are applied onto a chromate treated aluminium support; then a transparent varnish according to Examples 4–9 is applied and crosslinked, for 1 h at T=80° C. for the Examples 5, 7, 9 (isocyanate crosslinking) and for 30' at T=150° C. for the examples 4, 6, 8 (melamine crosslinking). Films of 25 micron thickness are obtained. On the obtained films following evaluation tests are carried out:

a) MEK test: the surface of the painted sample is submitted to repeated rubbing by a cotton pad soaked in MEK; the number of double strokes not causing removal of the film is reported;

b) Adhesion: according to ASTM D 3359 standard (cross-cut test);

c) Pencil hardness: according to ASTM D 3363 standard;

d) Bending test: according to ASTM D 522 standard;

e) Gloss: according to ASTM D 523 standard;

f) Resistance to the immersion in water: according to D 870 standard. The blistering degree is evaluated according to ASTM D 714 standard after 400 hours of immersion at the temperature of 40° C.

The results are shown in Table 2.

TABLE 2

| Test | Examples | | | | | |
|---|---|---|---|---|---|---|
| | 4 | 5 | 6 | 7 | 8 comparison | 9 comparison |
| MEK test | >100 | >100 | >100 | >100 | >100 | >100 |
| Adhesion | 100% | 100% | 100% | 100% | 100% | 100% |
| Hardness | H/9H | F/8H | HB/4H | B/3H | H/3H | F/2H |
| Bending test | passed | passed | passed | passed | passed | passed |
| Gloss | 85 | 84 | 86 | 84 | 84 | 82 |
| Immersion Resistance * | 10 | 10 | 10 | 10 | 4 | 4 |

\* 10 = no effect; 8 = slight effect; 6 = moderate effect; 4 = considerable effect; 2 = severe effect.

As it can be noticed, the polyesters of the present invention show mechanical and appearance properties quite comparable with control polyesters not containing the hydroxy-terminated PFPE; the polyesters of the present invention show moreover an exceptional resistance to immersion in water, showing therefore a remarkable barrier effect of the PFPE, to the penetration of water through the film.

We claim:

1. Crosslinkable resins based on fluorinated polyesters having a high functionality and having a fluorine content of about 0.5–40% by weight, the cross-linkable resins being soluble in xylene at 70% based on the weight of xylene, the cross-linkable resins being obtained by reacting (i) a hydroxy-terminated perfluoropolyether having a number average molecular weight from 400 to 3000, (ii) a compound containing from 3 to 20 carbon atoms selected from the group consisting of acid anhydrides, diacids, and mixtures thereof, (iii) a diol containing from 3 to 20 carbon atoms, and (iv) a polyol containing from 3 to 20 carbon atoms and having a functionality of three or greater.

2. Resins according to claim 1, wherein $R_f$ comprises constituent units of the following types:

1) $(C_3F_6O)$ and $(CFXO)$ randomly distributed along the perfluoropolyether chain, where X is equal to —F, —$CF_3$;

2) $(C_3F_6O)$;

3) $(C_3F_6O)$, $(C_2F_4O)$, $(CFXO)$, randomly distributed along the perfluoropolyether chain, wherein X is equal to —F, —$CF_3$;

4) $(C_2F_4O)$, $(CF_2O)$ randomly distributed along the perfluoropolyether chain.

3. Resins according to claim 1, wherein the hydroxy-terminated perfluoropolyether has a number average molecular weight between 500 and 1500.

4. Resins according to claim 1, wherein the hydroxy-terminated perfluoropolyether has the formula:

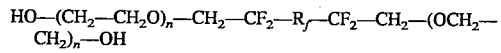

where n is 0 or an integer from 1 to 4, and $R_f$ represents a bifunctional radical having perfluoropolyethereal structure of number average molecular weight of from 400 to 3000, formed by sequences of one or more oxyfluoroalkylenic units.

5. Resins according to claim 4, wherein the $R_f$ radical comprises oxyfluoroalkylenic units selected from the group consisting of:

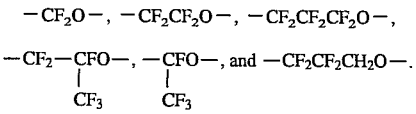

6. Resins according to claim 2, wherein $R_f$ is selected from the group consisting of:

A) —$(C_3F_6O)_m(C_2F_4O)_n(CFXO)_q$—

X is —F or —$CF_3$; and m is an integer, n and q are integers or 0, and the values of m, n and q are such that number average molecular weight of $R_f$ is at least 400, and B) —$(C_2F_4O)_p(CF_2O)_q$— p and q are integers, and the ratio p/q is from 0.2 to 5, extremes included.

7. The resins according to claim 1, wherein the resins are obtained in a polycondensation process comprising the following steps:

(a) adding the hydroxy-terminated perfluoropolyether to the acid anhydride at a temperature from 80° C. to 150° C., extremes included, to obtain a —COOH terminated perfluoropolyether having the formula:

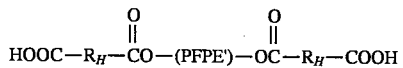

where $R_H$ is the anhydride residue, and (PFPE') is a bifunctional radical having the following formula:

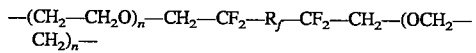

n is 0 or an integer from 1 to 4, and $R_f$ represents a bifunctional radical having perfluoropolyethereal structure of number average molecular weight of from 400 to 3000, formed by sequences of one or more oxyfluoroalkylenic units, and (b) adding a mixture comprising the diol and the polyol to the product obtained in step (a) at a temperature between 180° C. and 220° C.

8. The resins according to claim 7, wherein a polycondensation catalyst is used during step (b).

9. The resins according to claim 7, wherein the mixture added in step (b) additionally comprises a compound selected from the group consisting of acid anhydrides, diacids, and mixtures thereof.

10. The —COOH terminated perfluoropolyether obtained in step (a) of claim 7.

11. Blends of the resins according to claim 1 with fluorinated resins and hydrogenated resins selected from the group consisting of hydrogenated polyesters, acrylic resins, and polyurethanes.

* * * * *